US006848255B2

(12) United States Patent
Chiaramonte

(10) Patent No.: US 6,848,255 B2
(45) Date of Patent: Feb. 1, 2005

(54) HYDRAULIC FAN DRIVE SYSTEM

(75) Inventor: Michael P. Chiaramonte, Bolingbrook, IL (US)

(73) Assignee: Caterpillar Inc, Peoria, IL (US)

( * ) Notice: Subject to any disclaimer, the term of this patent is extended or adjusted under 35 U.S.C. 154(b) by 119 days.

(21) Appl. No.: 10/323,619

(22) Filed: Dec. 18, 2002

(65) Prior Publication Data

US 2004/0118114 A1 Jun. 24, 2004

(51) Int. Cl.[7] .................................................. F16D 31/02
(52) U.S. Cl. ............................................ 60/456; 91/516
(58) Field of Search ............................... 60/456; 91/516

(56) References Cited

U.S. PATENT DOCUMENTS

| | | | | |
|---|---|---|---|---|
| 3,659,567 A | | 5/1972 | Murray | |
| 4,034,563 A | | 7/1977 | Orth | |
| 4,179,888 A | | 12/1979 | Goscenski, Jr. | |
| 4,189,919 A | | 2/1980 | Goscenski, Jr. | |
| 4,200,146 A | | 4/1980 | Olson | |
| 4,223,646 A | | 9/1980 | Kinder | |
| 4,446,697 A | | 5/1984 | Goscenski, Jr. | |
| 4,470,259 A | | 9/1984 | Miller et al. | |
| 4,470,260 A | | 9/1984 | Miller et al. | |
| 4,738,330 A | | 4/1988 | Suzuki et al. | |
| 5,165,377 A | | 11/1992 | Hosseini | |
| 5,315,829 A | | 5/1994 | Fischer | |
| 5,507,360 A | | 4/1996 | Simmons | |
| 5,666,807 A | | 9/1997 | Bianchetta | |
| 5,927,072 A | | 7/1999 | Vannette | |
| 5,960,628 A | * | 10/1999 | Machesney et al. | 91/516 |
| 6,016,657 A | | 1/2000 | Buschur | |
| 6,179,570 B1 | | 1/2001 | Smith | |
| 6,260,440 B1 | | 7/2001 | Cronin et al. | |
| 6,286,308 B1 | * | 9/2001 | Yoshida et al. | 60/456 |
| 6,314,729 B1 | | 11/2001 | Crull et al. | |
| 6,681,568 B2 | * | 1/2004 | Smith | 60/456 |

* cited by examiner

*Primary Examiner*—Edward K. Look
*Assistant Examiner*—Michael Leslie
(74) *Attorney, Agent, or Firm*—Steven M Hanley; J W Burrows; D J Barnes

(57) ABSTRACT

A fan drive system includes a pump, at least one implement arrangement in fluid communication with the pump and a fan drive unit driveably connected to the pump. The fan drive unit is in fluid communication with the pump through a modulation valve. A signal operator is structured and arranged to receive at least one implement signal and a fan drive signal and generate a load signal output, wherein the pump is adapted to modify an output flow of the pump in response to the load signal. A control valve is urged to respond under the influence of a sensed condition and is in fluid communication with the modulation valve and the signal operator through a signal conduit.

4 Claims, 3 Drawing Sheets

HYDRAULIC FAN DRIVE SYSTEM

TECHNICAL FIELD

This invention generally relates to hydraulically driven implement systems and more particularly to combining a fan drive system with multiple implement control systems such that a common source of pressurized hydraulic fluid is utilized.

BACKGROUND

In machines, such as earth moving equipment having hydraulic implement systems, it is desirable that a dedicated hydraulic system be employed to charge a braking system. Typically, the dedicated hydraulic system directs pressurized fluid to mechanical brake assemblies which, in turn, are attached to ground engaging wheels to reduce the ground speed of the machine. Additionally, these machines also employ an auxiliary or secondary hydraulic system to drive a hydraulically operated fan motor, for example, to control the temperature of heat generating equipment such as an internal combustion engine.

It is known to combine various hydraulic implement control systems into a common hydraulic circuit such that a single source of pressurized fluid is provided to animate the various implement systems. For example, U.S. Pat. No. 6,314,729 B1, issued Nov. 13, 2001 to Crull et al. discloses a fan drive system including a pump hydraulically connected to a load sense circuit which provides fluid to first and second work circuits in addition to supplying fluid to a hydraulically driven fan unit. The fan drive system employs an electronic controller which, depending on the sensed temperature to be controlled, directs an electrical current to a proportional valve to modify the pressure drop across the fan motor.

However, the system disclosed by Crull et al. may lack suitable response performance since the signal circuitry of the proportional valve provides flow-modifying feedback to the load sensing pump and the proportional relief valve through the supply line. As a result, the fan motor may continue to run at an unwarranted level due to response performance. In fact, it has become imperative that the fan motor operates as sparingly as acceptable since the fan drive unit typically emits significant levels of noise which are undesirable to the operator. Moreover, the load sensing signals directed to the pump are similarly configured such that load communication between the work circuits, the fan drive system and the pump cause lethargic circuit response and as a result the system may be prone to inefficient operation. Additionally, the fan drive system is in continuous communication with the pump through a pressure reduction valve which leads to inefficient operation of the fan circuit. Such inefficient operation typically results in increased costs associated with ineffective operation and increased maintenance of the fan drive system in addition to the unwarranted noise generated by such a system.

Accordingly, it would be desirable to provide an efficient hydraulic fan drive system which may overcome one or more of the problems or disadvantages as set forth above.

SUMMARY OF THE INVENTION

The present invention relates to a fan drive system including a pump, at least one implement arrangement in fluid communication with the pump, a fan drive unit driveably connected to the pump, a modulation valve, a signal operator and a control valve. The fan drive unit is in fluid communication with the pump through the modulation valve. The signal operator is structured and arranged to receive at least one implement signal and a fan drive signal and generate a load signal output, wherein the pump is adapted to modify an output flow of the pump in response to the load signal. The control valve is urged to respond under the influence of a sensed condition and is in fluid communication with the modulation valve and the signal operator through a signal conduit.

The present invention further relates to a fan drive system including a pump, at least one implement arrangement in fluid communication with the pump, a fan drive unit driveably connected to the pump, a modulation valve, a signal operator, a control valve and a priority operator. The fan drive unit is in fluid communication with the pump through the modulation valve. The signal operator is structured and arranged to receive at least one implement signal and a fan drive signal and generate a load signal output, wherein the pump is adapted to modify an output flow of the pump in response to the load signal. The control valve is urged to respond under the influence of a sensed condition and is in fluid communication with the modulation valve and the signal operator through a signal conduit. The pump is in communication with the at least one implement arrangement through the priority operator and the priority operator is adapted to divide flow between the at least one implement arrangement and the fan drive unit.

The present invention further relates to a method of operating a fan drive system, comprising: causing fluid urged from a pump to be directed to at least one implement arrangement and a fan drive unit; causing the fan drive unit to modify its demand based on a sensed condition signal from a control valve; causing the implement arrangement to modify its demand based on a pressure condition signal of the implement arrangement; causing the pump to modify its demand based on a load condition signal of the pump; directing the sensed condition signal, the pressure condition signal and a load condition signal into a signal operator; and communicating demand of one of the implement arrangement and the fan drive unit to the pump through the signal operator.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

The exemplifications set out herein illustrate embodiments of the invention and such exemplifications are not to be construed as limiting the scope of the invention in any manner.

DETAILED DESCRIPTION

Reference will now be made in detail to embodiments of the invention, examples of which are illustrated in the accompanying drawings. Wherever possible, the same or corresponding reference numbers will be used throughout the drawings to refer to the same or corresponding parts.

Figure 1:
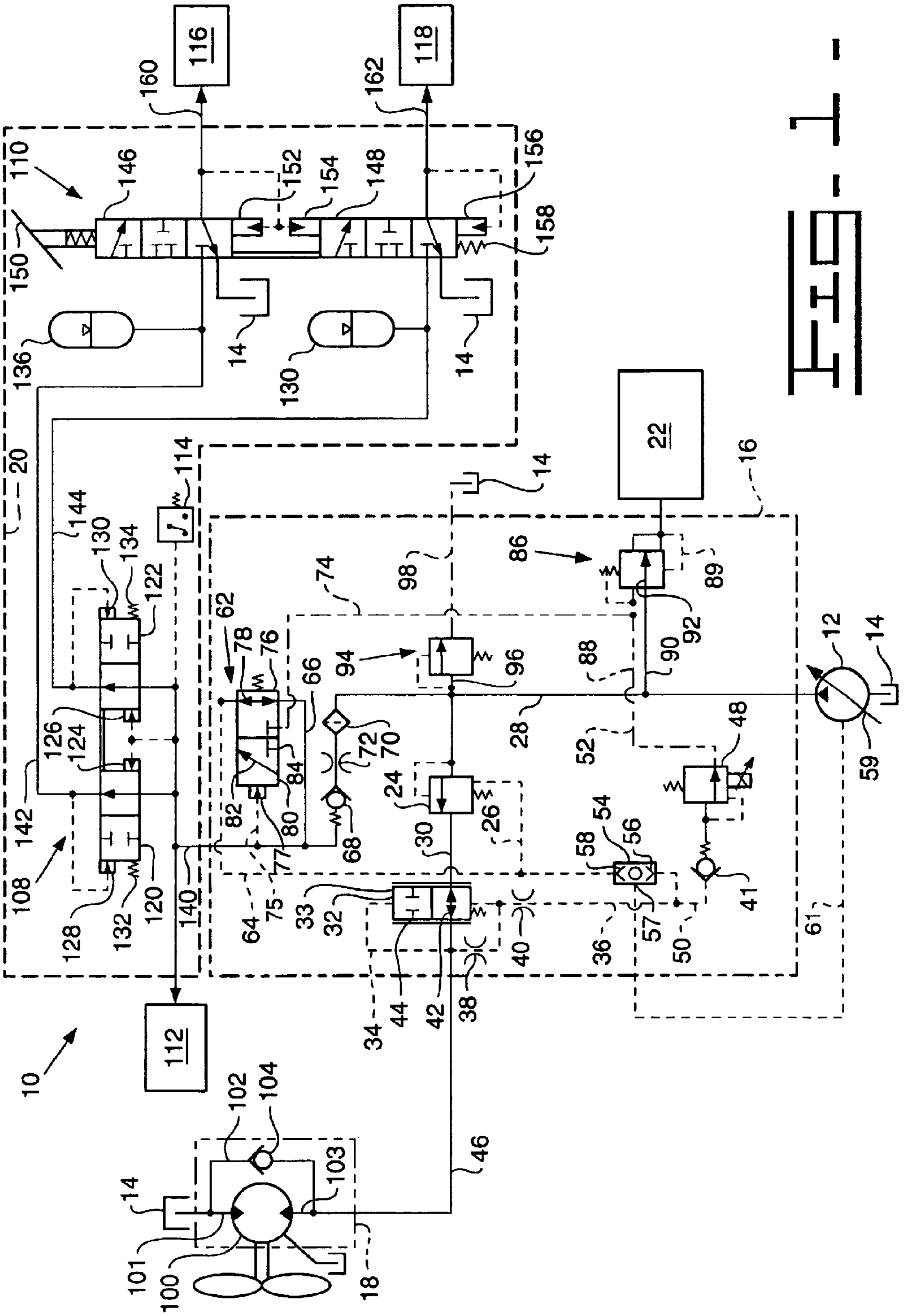
FIG. 1 is a schematic representation of a first embodiment of a fluid system according to the present invention.

Referring to FIG. 1, a hydraulic fan drive system 10 is shown and includes a source of pressurized fluid 12, such as a pump which draws fluid from a reservoir 14, for example. The fan drive system 10 further includes a fluid circuit 16 hydraulically connected to a primary implement arrangement 20, a secondary implement arrangement 22 and a fan drive unit 18, all of which are hydraulically energized via the pump 12.

The fluid circuit 16 includes a priority valve 24 fluidly connected to the pump 12 through a conduit 28. The priority valve 24 may be a normally closed, infinite position pressure relief valve having a pilot assist signal conduit 26 which directs signal fluid to a spring end of the valve 24. A conduit 30 is positioned immediately downstream of the priority valve 24 to fluidly connect the priority valve with a proportional modulation valve 32.

The fluid circuit 16 includes the modulation valve 32 positioned downstream of the priority valve 24. The modulation valve 32 includes a first signal conduit 34 and a second signal conduit 36. First and second orifices 38, 40, which may have 0.8 mm diameters, for example, may be respectively provided within the first and second signal conduits 34, 36. A check valve 41, provided in a signal conduit 50 connected to signal conduit 36, is positioned upstream of a control valve 48. The modulation valve 32 includes a moveable internal member or spool 33 having an internal flow passage 42 at an end thereof and a flow-blocking portion 44 is provided on the other end of the spool 33. A conduit 46 extends between the modulation valve 32 and the fan drive unit 18.

The fluid circuit 16 of the fan drive system 10 includes a control valve 48 which may be, for example, a solenoid controlled, variable position, normally open relief valve 32. A signal conduit 52 fluidly connects the downstream portion of the valve 48 with other signal conduits leading to reservoir 14. In an exemplary embodiment the electronic control valve 48 is operative in response to receipt of an electrical signal indicative of engine water jacket temperature, induction manifold temperature, retarder oil temperature or any other temperature based parameter which is known to those having ordinary skill in the art. It is further envisioned that the electrical signal, indicative of any one of said temperature sources, may be obtained by a temperature sensor in communication with an electronic control module, as is customary.

A signal operator 54 is in fluid communication with the signal conduit 50 of the electronic control valve 48 and includes a first port 56, a second port 58, an outlet port 57 and a moveable member 60 therein which alternatively blocks ports 56, 58 depending on signal strength. In an exemplary embodiment the signal operator 54 is a shuttle valve, for example. It may be seen that the pump 12 may be a pressure compensated pump having a variable displacement, controllable element 59 reactive to fluid signal pressure communicated through load signal conduit 61. In turn, load signal conduit 61 is fluidly connected to the output 57 of the signal operator 54.

A charge valve 62, which may be a two-position, pilot operated valve for example, provides pump flow from a conduit 66 to a signal conduit 64 when the valve is in a first position (as shown in FIG. 1). A first portion 76 of the valve 62, which is operative in the first shown valve position, includes a flow passage 78 to fluidly connect the signal conduit 74 with the conduit 66. In a second position, a second portion 80 of the valve 62 includes a signal passage 82 which fluidly connects a signal conduit 85 with the signal conduit 64. Upstream of the charge valve 62, there is provided a filter 70, an orifice 72 and a check valve 68 to ensure sufficiently pressurized, stable and non-contaminated fluid passes to the charge valve in addition to the remaining circuitry downstream of the charge valve 62. Fluid ultimately passing through the check valve 68 will be communicated to a pilot 77 on the charge valve 62 through a signal conduit 75. A predetermined pressure level within the signal conduit and the pilot 77 causes the valve 62 to shift to its second position. Notably, in the second valve position fluid pressure delivered by the pump 12 to the signal conduit 64 is blocked by a blocked port 84 within the second portion 80 of the valve 62.

A standby pressure-reducing valve 86 is included in the fluid circuit 16 and may include a normally open biasing relief valve. Valve 86 includes a signal conduit 88 and spring bias to urge the valve in an open position. A downstream signal conduit 89 provides fluid pressure to act on the respective end of the valve 86 to urge the valve closed. A conduit 90 supplies pump pressure to the valve 86 and a flow passage 92 within the valve 86 fluidly connects the pump pressure from the conduit 90 to the secondary implement arrangement 22. The secondary implement arrangement may be, for example, a source of pilot pressure for a hoist valve actuator for an off-highway dump truck or any other suitable secondary implement arrangement.

A pressure relief valve 94 is provided within the fluid circuit 16 to prevent an over pressure condition of the fan drive system 10. A conduit 96 connects the pump pressure within the conduit 28 to the relief valve 94 and a conduit 98 connects the relief valve 94 with the reservoir 14.

The fan drive unit 18 includes a fluid actuator 100, which may be a bi-directional fluid motor, for example, fluidly connected to conduit 46 at a position upstream of the motor 100. An outlet 101 of the motor 100 is fluidly connected to the reservoir 14. An anti-cavitation conduit 102 is provided in parallel with the motor 100, between the reservoir 14 and an inlet 103 of the motor, to provide make-up fluid to the motor inlet should the outlet pressure exceed the motor inlet pressure. A check valve 104 is provided within the conduit 102, as is customary, to provide one-way flow of fluid from the motor outlet 101 to the motor inlet 103.

The fluid circuit 16 is hydraulically connected to the priority implement arrangement 20 which, in an exemplary embodiment, is an actuation and charging system such as, for example, a hydraulic brake system. Alternatively, it is envisioned that the priority implement arrangement 20 may be a hydraulic steering system, lubrication system, hydrostatic transmission system or any other hydraulic system requiring priority fluid pressure known to those having ordinary skill in the hydraulically activated implement or hydraulic work system arts.

The priority implement arrangement 20 includes an inverse shuttle circuit 108 fluidly connected to a hydraulic brake circuit 110. A hydraulically activated parking brake system 112 and front and rear brake systems 116, 118 may be hydraulically connected, as illustrated, with the priority implement arrangement 20 to provide a complete braking system for a mobile machine such as an agricultural or construction vehicle, such as a truck or skid steer loader, for example.

The inverse shuttle circuit 108 of the primary implement arrangement 20 includes a first two-position valve 120 and a second two-position valve 122. The first and second valves 120, 122 respectively include upstream signal ports 124, 126 and downstream signal ports 128, 130. Finally, bias members 132, 134 are respectively included with each of the first and second valves 120, 122 to close each valve when the downstream pressure is substantially the same as the upstream pressure. Alternatively, the bias members 132, 134 respectively assist closing valves 120, 122 when the upstream pressure is substantially less than the downstream pressure. In operation, if the pressure in one of the downstream signal ports significantly decreases, such as the pressure in port 128, the valve 120 will shift open and allow pump pressure to be communicated downstream to a front brake accumulator 136. Similarly, if the pressure in port 130 were suddenly decreased, the valve 122 would shift open and allow pump pressure to be communicated downstream to a rear brake accumulator 138. Moreover, the inverse shuttle circuit 108 provides the lowest accumulator pressure to be sensed in conduit 140 which is connected to the sensor switch 114 and the charge valve 62.

The inverse shuttle circuit 108 receives fluid pump pressure through the conduit 140 whereas fluid pressure discharged from this circuit is branched between the front and rear brake systems 116, 118 through respective conduits 142, 144.

The primary implement arrangement 20 further includes the hydraulic brake circuit 110. The hydraulic brake circuit 110 includes a front brake valve 146 and a rear brake valve 148. Front and rear brake valves may be three position valves or any other valve combination known to those having ordinary skill in the hydraulic brake system arts. The front brake valve 146 may be engaged by a lever 150 such as a foot pedal, for example. The front brake valve 146 further includes a downstream signal port 152. The rear brake valve 148 includes a first signal port 154 in fluid communication with the downstream signal port 152 of the front brake valve 146. The rear brake valve 148 also includes a second signal port 156. The rear brake valve 148 includes a bias member 158 which provides a force that complements the force imposed by pressure impinging on a spool end (not shown) in the second port 156 and a opposes the force imposed by pressure impinging on the other end of the spool (not shown) in the first port 154 of the rear brake valve 148. Front and rear brake conduits 160, 162 respectively connect the front brake and the rear brake valves to the front and the rear brake systems 116, 118.

Operation of the hydraulic brake circuit 110 of the priority implement arrangement 20 will now be described. In operation, manipulation of the lever 150 causes the front brake conduit 160 to be successively blocked from the reservoir 14 and thereafter, open to the associated front brake accumulator 136. This accumulator pressure is transmitted to both the downstream signal port 152 and the first signal port 154 in the rear brake valve 148. As a result, the rear brake valve 148 successively blocks the tank and opens to the associated rear brake accumulator 138. Once the lever 150 is released, the front brake valve returns 146 to its original position with the pressure in the conduit 160 being relieved to tank 14 which, in turn, causes repositioning of the rear brake valve 148 to its original position. Accordingly, pressure in the rear brake conduit 162 is then relieved to the tank 14 through the rear brake valve 148.

Figure 2:
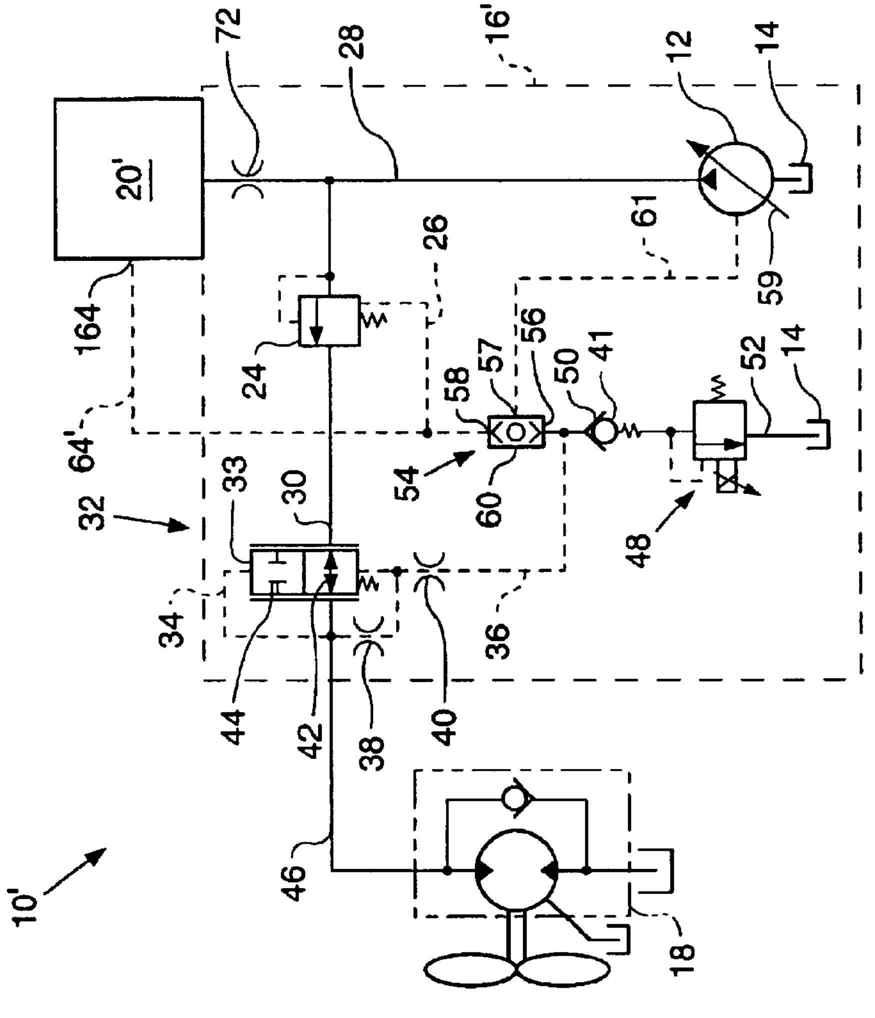
FIG. 2 is a schematic representation of a second embodiment of a fluid system according to the present invention.

Referring to FIG. 2, shown is a second embodiment of a hydraulic fan drive circuit wherein certain corresponding elements are denoted by primed reference numerals. A hydraulic fan drive circuit 10' includes a pump 12 which draws fluid from a reservoir 14, for example. The fan drive system 10' further includes a fluid circuit 16' hydraulically connected to a primary implement arrangement 20' and a fan drive unit 18, all of which are hydraulically energized via the pump 12.

The fluid circuit 16' includes a priority valve 24 fluidly connected to the pump 12 through a conduit 28. The priority valve 24 may be a normally closed, infinite position pressure relief valve having a pilot assist signal conduit 26 which directs signal fluid to a spring end of the valve 24. A conduit 30 is positioned immediately downstream of the priority valve 24 to fluidly connect the priority valve with a proportional modulation valve 32.

The fluid circuit 16' includes the modulation valve 32 positioned downstream of the priority valve 24. The modulation valve 32 includes a first signal conduit 34 and a second signal conduit 36. First and second orifices 38, 40, which may have 0.8 mm diameters, for example, may be respectively provided within the first and second signal conduits 34, 36. A check valve 41 is provided in a signal conduit 50 upstream of a control valve 48. The modulation valve 32 includes a moveable internal member or spool 33 having an internal flow passage 42 at an end thereof and a flow-blocking portion 44 is provided on the other end of the spool 33. A conduit 46 extends between the modulation valve 32 and the fan drive unit 18.

The fluid circuit 16' of the fan drive system 10 includes the control valve 48 which may be, for example, a solenoid controlled, variable position, normally open relief valve 32. A signal conduit 52 fluidly connects the downstream portion of the valve 48 with the reservoir 14. In an exemplary embodiment, the electronic control valve 48 is operative in response to receipt of an electrical signal indicative of engine water jacket temperature, induction manifold temperature, retarder oil temperature or any other temperature based parameter which is known to those having ordinary skill in the art. It is further envisioned that the electrical signal, indicative of any one of said temperature sources, may be obtained by a temperature sensor in communication with an electronic control module, as is customary.

A signal operator 54 is in fluid communication with the control valve 48 through the signal conduit 50 and includes a first port 56, a second port 58, an outlet port 57 and a moveable member 60 therein which alternatively blocks ports 56, 58 depending on signal strength. In an exemplary embodiment the signal operator 54 is a shuttle valve, for example. It may be seen that the pump 12 may be a pressure compensated pump having a variable displacement, controllable element 59 reactive to fluid signal pressure communicated through load signal conduit 61. In turn, load signal conduit 61 is fluidly connected to the output 57 of the signal operator 54.

The fluid circuit 16' provides continuous pressure supply to the priority implement 20' and utilizes feedback from the priority implement 20' via the signal conduit 64' to limit pressure to the fan during a charge or demand mode. The feedback of the priority implement 20' may include a signal port 164 in fluid communication with the signal operator 54 through the signal conduit 64'. Moreover, an orifice 72 is provided in the line 28 to dampen pressure pulses and to provide overall system stability. It may be seen that the priority valve 24 is adapted to close coincident with the priority implement 20' being under a pressure demand or charging mode. Hence, the fan 18 is allowed to be substantially blocked from the supply pressure when the priority implement 20' is being charged.

Figure 3:
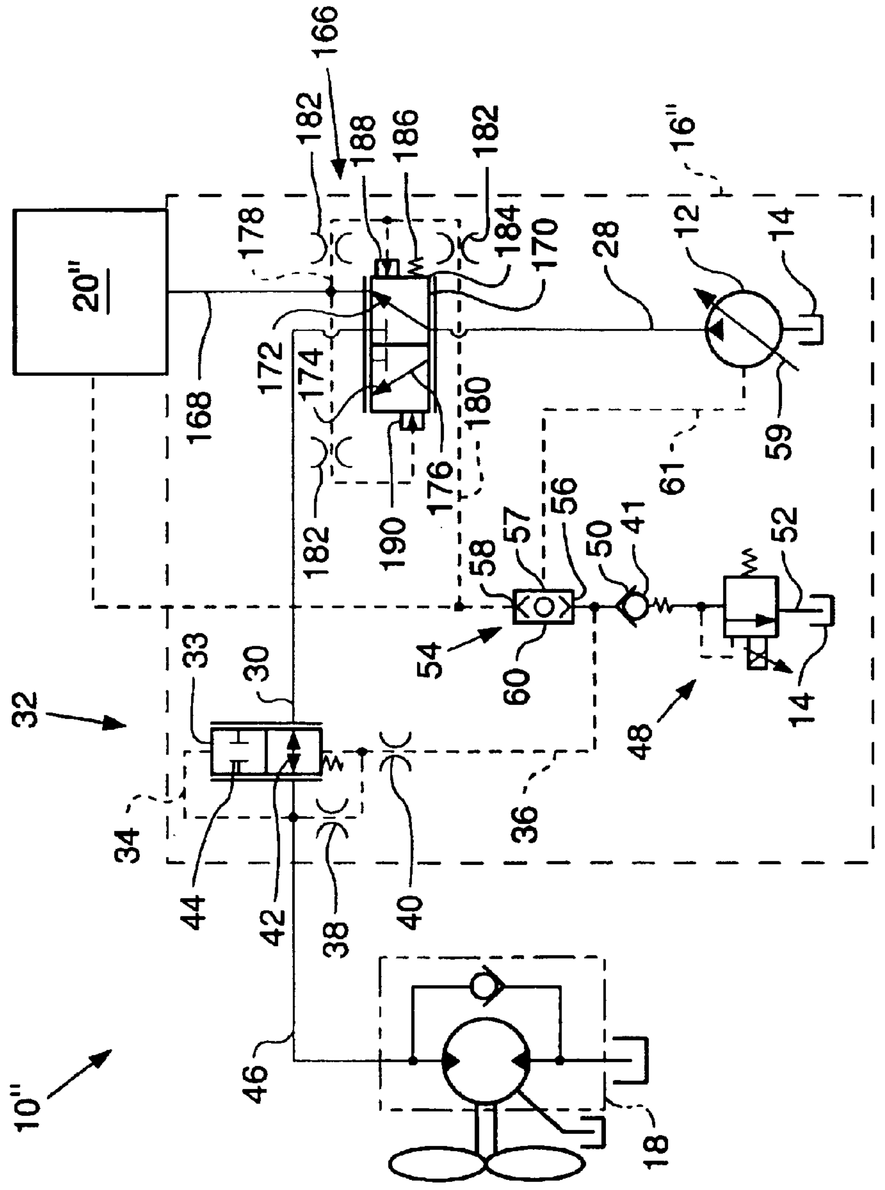
FIG. 3 is a schematic representation of a third embodiment of a fluid system according to the present invention.

Referring to FIG. 3, shown is a third embodiment of a hydraulic fan drive circuit 10" which includes a fluid circuit

16" hydraulically connected to a primary implement arrangement 20" and a fan drive unit 18, all of which are hydraulically energized via the pump 12.

The fluid circuit 16" includes a priority operator 166 fluidly connected to the pump 12 through a conduit 28. The priority operator 166 may be a proportional, pilot operated valve for example, which directs pump flow from the conduit 28 to the conduit 168 when the operator is in a first position (as shown in FIG. 3). A first portion 170 of the operator 166 includes a flow passage 172 to fluidly connect the conduit 28 with the conduit 168. In a second position of the priority operator 166, a second portion 174 of the valve 166 includes a flow passage 176 which fluidly connects the conduit 28 with the conduit 30.

The priority operator 166 includes a first signal conduit 178 and a second signal conduit 180. First, second and third orifices 182, which may have 0.8 mm diameters, for example, may be respectively provided within the first and second signal conduits 178, 180. The signal conduit 180 is connected to the port 58 of the signal operator and an end 184 of the priority operator 166 includes a spring 186 to urge the valve into its first position coinciding with supply pressure being directed to the priority implement 20". The priority operator 166 also includes opposing pilots 188, 190 in fluid communication through the signal conduit 178.

The fluid circuit 16" includes the modulation valve 32 positioned downstream of the priority operator 166. The modulation valve 32 includes a first signal conduit 34 and a second signal conduit 36. First and second orifices 38, 40, which may have 0.8 mm diameters, for example, may be respectively provided within the first and second signal conduits 34, 36. A check valve 41 is provided in a signal conduit 50 upstream of the control valve 48. The modulation valve 32 includes a moveable internal member or spool 33 having an internal flow passage 42 at an end thereof and a flow-blocking portion 44 is provided on the other end of the spool 33. A conduit 46 extends between the modulation valve 32 and the fan drive unit 18.

The fluid circuit 16" of the fan drive system 10" includes the control valve 48. A signal conduit 52 fluidly connects the downstream portion of the valve 48 with the reservoir 14. In an exemplary embodiment, the control valve 48 is operative in response to receipt of an electrical signal indicative of engine water jacket temperature, induction manifold temperature, retarder oil temperature or any other temperature based parameter which is known to those having ordinary skill in the art.

A signal operator 54 is in fluid communication with the signal conduit 50 of the electronic control valve 48 and includes a first port 56, a second port 58, an outlet port 57 and a moveable member 60 therein which alternatively blocks ports 56, 58 depending on signal strength. In an exemplary embodiment the signal operator 54 is a shuttle valve, for example. It may be seen that the pump 12 may be a pressure compensated pump having a variable displacement, controllable element 59 reactive to fluid signal pressure communicated through load signal conduit 61. In turn, load signal conduit 61 is fluidly connected to the output 57 of the signal operator 54.

The hydraulic fan drive circuit 10" differs from the fan drive circuit 10' of FIG. 2 in several respects; one respect may include that the fluid circuit 16" directs supply fluid between the priority implement 20" and the fan 18 through the priority operator 166. Since flow through the priority operator 166 is proportional, in the exemplary embodiment, then the flow is continually being divided between the priority implement 20" and the fan 18 based on the requirements of the priority implement.

Industrial Applicability

In the operation of the embodiment set forth in FIG. 1, pressurized fluid from the pump 12 is transmitted to the priority implement arrangement 20 through the fluid circuit 16. The check valve 68 acts to ensure that a predetermined pressure level is maintained in the conduit 140 upstream of the inverse shuttle circuit 108. In so doing, this will ensure that the priority implement arrangement 20 is always supplied with a volume of fluid at a predetermined pressure level. In the exemplary embodiment, since it is generally desirable to ensure that a minimum pressure level is always present for proper operation of the brakes, accumulators 136, 138 are employed. The accumulators 136, 138 act to store a volume of pressurized fluid in a known manner to further ensure that ample pressurized fluid is always available for the brake systems 116, 118. The pressure sensor or switch 114 is positioned within the hydraulic fan drive system 10 to continuously monitor the pressure of the fluid in the pressure conduit 140. It is envisioned that the signal provided by sensor/switch 114 may be communicated to an electronic controller (not shown), such as an electronic control module ("ECM"). The controller may be programmed to divert the required pressure from alternate sources of pressure to the brake system if the operating brake pressure were to decrease below a threshold amount. Additionally, an operator alarm or alert warranting immediately attention to the brake system is contemplated by the present hydraulic fan drive system.

In one mode of operation, the priority implement arrangement 20 will be under certain demand and require a significant portion of the pump's generated pressure, such as when the brake system requires to be charged. Specifically, during charge mode, the charge valve 62 senses that pressure in conduit 75 has dropped and shifts to allow accumulator pressure to travel to line 64 which provides the pressure signal to the pump. At the same time the fan drive circuit 18 may include a requirement for fluid flow from the pump to accordingly cool select heat generating componentry, as is customary. During a charging event the pump's flow is directed to the charge valve 62 through the conduit 28. The spring in the charge valve 62 is designed to retain the valve in its charging position (shown) via the spring force until a predetermined pressure is obtained. Once obtained, the pressure in the signal port 75 creates a force on the valve member which overcomes the spring bias. Consequently, the charge valve shifts to a bypass position and accordingly the signal conduit 74 is fluidly connected to the signal operator 54 through the charge valve 62. Notably, in the charge mode, the brake load is communicated to the signal operator 54 through the charge valve 62 and the fan load is communicated directly to the signal operator 54 at all times. In contrast, when the charge valve 62 is in the bypass mode the load of the secondary implement arrangement 22 substitutes the brake load and is communicated to the signal operator via the charge valve 62.

The fan drive circuit 18 is controlled via the modulation valve 32 being controlled based on the electronic control valve 48 sensing temperature. The flow the fan drive circuit 18 is dependent on the pressure commanded by the control valve 48 which communicates with the pump in the uncharging mode. In the charging mode the fan flow is dependent on the pressure commanded by 48 and the modulation of valve 32. The priority valve 24 can also limit flow to the fan if the pressure differential across 72 does not correspond to the required charge flow desired.

The priority valve 24 is normally closed and may be opened if the upstream pressure (in conduit 24) exceeds the sum of the force due to the signal pressure in signal conduit 26 and the biasing force of the spring within the priority valve 24. Thus, it may be seen that during charging, the pressure in conduit 26 will likely be at its greatest value and the priority valve 24 will be nearly closed allowing the pump's delivery to be almost exclusively to the brake system 20. In so doing, the priority valve 24 ensures that the flow across the orifice 72 is at the desired level. If the flow is too low then the low-pressure differential will cause the priority valve 24 to modulate closed to allow increased flow across the orifice 72.

During charging, the signal operator 54 receives signal flow, indicative of brake load, from the brake system 20 via shuttle port 58. Additionally, the signal operator 54 receives signal flow, indicative of fan load, from the fan drive circuit 18 via signal operator port 56. The stronger of the two signals will cause the signal operator 54 to provide the stronger load signal to the load conduit 61 of the load-sensing pump 12.

Conversely, when the brake system 20 is not charging, the pressure within the signal conduit 74, indicative of the load of the secondary implement arrangement, is communicated to the port 58 of the signal operator 54 via the charge valve 62. In so doing, the greater of the fan and secondary implement system will be conveyed to the load sensing conduit 61 of the load sensing pump 12. Accordingly, the pump 12 will effectively satisfy the demand based on the larger of the loads between the secondary implement and the fan systems.

The relief valve 94 is a normally closed valve and allows fluid to pass therethrough when a predetermined high pressure is attained to protect system components from overpressure. Other protective features of system 10 include the electronically controlled valve 48 being set to wide-open during an electricity failure to ensure enough flow is directed to the fan. Furthermore, the check valve 41 is sized to ensure that the fan rotates at all times by causing a predetermined pressure to be imposed on the biasing end of the valve spool (not shown) of the modulation valve 42 which results in the modulation valve 42 being "cracked open" with no demand on the fan drive circuit 18. Therefore, when the controller is not calling for cooling, the modulation valve 32 is being controlled by the check valve 41 and not the electronic control valve 48.

The fan drive is protected from overspeeding since the modulation valve 32 will reduce the pressure to coincide with the pressure commanded by the control valve 48. Valve 48 usually commands the pump in the uncharging mode but in the charging mode, valve 48 controls the modulation valve 32 to prevent the fan drive circuit 18 from overspeeding. Furthermore, the orifice 38 provided in conduit 34 of the modulation valve 32 and the orifice 40 provided in the conduit 36 downstream of the modulation valve 32 ensure that the fan operation remains stable and instabilities due to pressure fluctuations are minimized.

By combining the priority implement arrangement 20 and the fan drive circuit 18 within a common hydraulic system and utilizing a variable displacement pump 12, the operation of the pump becomes significantly more efficient over known combined systems. Since the system delivers the flow to the brake-charging portion of the circuit only when it is needed, the pump operates with high efficiency. Since the pump is required to operate only as much as needed it infrequently sustains continual operation at high pressures which significantly increases pump life and decreases the frequency of system maintenance at a significant cost savings.

Referring to FIG. 2, the operation of the hydraulic fan drive system 10' will be described. When the priority implement 20' is under demand or charge conditions, the priority implement 20' may require a significant portion of the pump's generated pressure, such as when a brake system requires to be charged, for example.

The fan drive circuit 18 is controlled via the modulation valve 32 being controlled based on the electronic control valve 48 sensing temperature. The fan drive circuit 18 is dependent on the pressure commanded by the control valve 48 which communicates with the pump in the uncharging mode. In the demand or charging mode the fan flow is dependent on the pressure commanded by 48 and the modulation of valve 32. The priority valve 24 can also limit flow to the fan if the pressure differential across 72 does not correspond to the required charge flow desired.

The priority valve 24 is normally closed and may be opened if the upstream pressure (in conduit 24) exceeds the sum of the force due to the signal pressure in signal conduit 26 and the biasing force of the spring within the priority valve 24. Thus, it may be seen that during charging, the pressure in conduit 26 will likely be at its greatest value and the priority valve 24 will be nearly closed allowing the pump's delivery to be almost exclusively to the priority implement 20'. In so doing, the priority valve 24 ensures that the flow across the orifice 72 is at the desired level. If the flow is too low then the low-pressure differential will cause the priority valve 24 to modulate closed to allow increased flow across the orifice 72.

During charging, the signal operator 54 receives signal flow, indicative of implement load, from the priority implement 20' via shuttle port 58. Additionally, the signal operator 54 receives signal flow, indicative of fan load, from the fan drive circuit 18 via signal operator port 56. The stronger of the two signals will cause the signal operator 54 to provide the stronger load signal to the load conduit 61 of the load-sensing pump 12.

Referring to FIG. 3, the operation of the hydraulic fan drive system 10" will be described. Fluid ultimately passing through the priority operator 166 will be communicated to opposing pilots 188, 190 on the priority operator 166 through the signal conduit 178. During priority mode operation, a substantially uniform pressure may preside within the signal conduits 178 and 180 feeding the respective pilots 188, 190 which results in a canceling of the pressure induced forces on the priority operator 166. As a result, the spring 186 invokes a spring bias on the priority operator 166 to urge the same to its first or priority position. Notably, if pressure in the conduit 180 deteriorates, which may be indicative of decreased pressure demand of the primary implement 20" then the primary operator 166 shifts to its second position and fluid pressure is delivered by the pump 12 to the fan 18 through the modulation valve 32.

It will be apparent to those skilled in the art that various modifications and variations can be made in the disclosed hydraulic fan drive system without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A fan drive system comprising:

a pump;

at least one implement arrangement in fluid communication with said pump;

a fan drive unit driveably connected to said pump;

a modulation valve, said fan drive unit being in fluid communication with said pump through said modulation valve;

a signal operator structured and arranged to receive at least one implement signal and a fan drive signal and generate a load signal output, wherein said pump being adapted to modify an output flow of said pump in response to said load signal;

a control valve urged to respond under the influence of a sensed condition, said control valve being in fluid communication with said modulation valve and said signal operator through a signal conduit; and a priority operator, said pump being in communication with said at least one implement arrangement through said priority operator, said priority operator being adapted to divide flow between said at least one implement arrangement and said fan drive unit.

2. The fan drive system of claim 1 wherein said priority operator is in communication with said signal operator through a signal conduit and said priority operator is influenced to divide flow based on said communication between said priority operator and said signal operator.

3. The fan drive system of claim 1, wherein said control valve is operable to modify flow therethrough based on a sensed temperature.

4. The fan drive system of claim 1 wherein said pump is in fluid communication with said signal operator through a load signal conduit.

* * * * *